United States Patent
Takeuchi et al.

(10) Patent No.: US 6,782,713 B2
(45) Date of Patent: Aug. 31, 2004

(54) REFRIGERANT CYCLE WITH EJECTOR HAVING THROTTLE CHANGEABLE NOZZLE

(75) Inventors: Masayuki Takeuchi, Nukata-gun (JP); Yoshitaka Tomatsu, Chiryu (JP); Yasushi Yamanaka, Nakashima-gun (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/649,065

(22) Filed: Aug. 27, 2003

(65) Prior Publication Data

US 2004/0040340 A1 Mar. 4, 2004

(30) Foreign Application Priority Data

Aug. 29, 2002 (JP) ........................................ 2002-250349

(51) Int. Cl.[7] .................................................. F25B 1/06
(52) U.S. Cl. .............................. 62/500; 62/191; 62/527
(58) Field of Search .......................... 62/114, 115, 191, 62/500, 527, 528

(56) References Cited

U.S. PATENT DOCUMENTS 6,438,993 B2 * 8/2002 Takeuchi et al. .............. 62/500
6,477,857 B2 * 11/2002 Takeuchi et al. .............. 62/500
6,574,987 B2 * 6/2003 Takeuchi et al. .............. 62/500
6,584,794 B2 * 7/2003 Takeuchi et al. .............. 62/278

FOREIGN PATENT DOCUMENTS

| JP | 5-312421 | 11/1993 |
| JP | 11-37577 | 2/1999 |

* cited by examiner

Primary Examiner—Denise L. Esquivel
Assistant Examiner—Malik N. Drake
(74) Attorney, Agent, or Firm—Harness, Dickey & Pierce, PLC

(57) ABSTRACT

A refrigerant cycle includes an ejector having a throttle changeable nozzle. In the refrigerant cycle, a control valve having a needle valve controls a pressure of a middle-pressure refrigerant in a bypass passage, and a pilot valve controls a throttle opening degree of the nozzle in accordance with a pressure difference between the pressure of the middle-pressure refrigerant in the bypass passage and the refrigerant pressure in a high-pressure refrigerant inlet port of the ejector. When an opening degree of the needle valve is changed in accordance with a load variation or a load state, the pressure of the middle-pressure refrigerant in the bypass passage is changed. Accordingly, the moving position of the pilot valve is controlled, and the throttle opening degree of the nozzle is controlled.

11 Claims, 5 Drawing Sheets

REFRIGERANT CYCLE WITH EJECTOR HAVING THROTTLE CHANGEABLE NOZZLE

CROSS-REFERENCE TO RELATED APPLICATION

This application is related to and claims priority from Japanese Patent application No. 2002-250349 filed on Aug. 29, 2002, the contents of which are hereby incorporated by reference.

BACKGROUND OF THE INVENTION

1. Field of the Invention

The present invention relates to a refrigerant cycle, for example, used for an air conditioner of a vehicle or an electric water heater. More particularly, the present invention relates to a refrigerant cycle including an ejector having a throttle changeable nozzle.

2. Description of Related Art

FIG. 7 shows a conventional ejector cycle (refrigerant cycle) described in JP-A-11-37577. The ejector cycle includes a compressor 101, a gas cooler 102, an ejector 103 and a gas-liquid separator 104, which are circularly connected. Moreover, the ejector cycle has a fixed throttle 105 serving as a decompressing device, and an evaporator 106 in a bypass passage. In the bypass passage, liquid refrigerant separated by the gas-liquid separator 104 flows into a low pressure refrigerant inlet 109 of the ejector 103 through the fixed throttle 105 and the evaporator 106. The ejector 103 includes a throttle unchangeable nozzle 107 having a fixed throttle that is unchangeable irrespective of a circulating amount of refrigerant in the ejector cycle. When the ejector cycle is, for example, employed for an air conditioner of an automobile, the air conditioner may be used to cool a passenger compartment with a high load in summer, and may be used to dehumidify the passenger compartment with a low load in winter. That is, the ejector cycle is required to be used under various use conditions. Accordingly, the throttle unchangeable nozzle 107 of the ejector 103 cannot deal with various loads caused by the various use conditions.

FIG. 8 shows an ejector 110, which has a changeable nozzle 112 and is described in JP-A-5-312421. The changeable nozzle 112 has a needle valve 111, which can control a throttle opening degree (exit opening dimension) of the throttle changeable nozzle 112. However, when an ejector cycle having the throttle changeable nozzle 112 is made so as to be able to deal with the various loads, the stroke range of the needle valve 111 is required to be larger. Accordingly, a valve control system for controlling the needle valve 111 is required to be larger.

SUMMARY OF THE INVENTION

In view of foregoing problems, it is an objective of the present invention to provide a refrigerant cycle with an ejector having a throttle changeable nozzle, which has a reduced size. It is another objective of the present invention to provide a refrigerant cycle with an ejector including a throttle changeable nozzle in which a throttle opening degree is suitably changed in accordance with a load change while the size of the ejector can be reduced.

According to the present invention, a refrigerant cycle includes a gas-liquid separator for separating refrigerant into gas refrigerant and liquid refrigerant, an evaporator in which the liquid refrigerant flowing from the gas-liquid separator is evaporated after being decompressed, a compressor for compressing the gas refrigerant from the gas-liquid separator, a radiator which cools the refrigerant discharged from the compressor, an ejector and a throttle control system. The ejector includes a high-pressure refrigerant inlet port from which refrigerant from the radiator is introduced, a low-pressure refrigerant inlet port from which refrigerant from the evaporator is sucked, a nozzle for decompressing refrigerant introduced from the high-pressure refrigerant inlet port, and a pressure-increasing portion in which refrigerant from the evaporator is sucked through the low-pressure refrigerant inlet port by a flow of refrigerant jetted from the nozzle and is mixed with the refrigerant jetted from the nozzle. The pressure-increasing portion of the ejector has a refrigerant outlet from which refrigerant is discharged to the gas-liquid separator. In the refrigerant cycle, the throttle control system includes a bypass passage diverged from a refrigerant passage at a diverging point that is upstream from the high-pressure refrigerant inlet port and being joined to the refrigerant passage at a join point that is downstream from the diverging point, a control valve for controlling a pressure of the refrigerant flowing through the bypass passage, and a pilot valve that controls of a throttle opening degree of the nozzle in accordance with a pressure difference between the refrigerant in the bypass passage and the refrigerant in the high-pressure refrigerant inlet port of the ejector. Accordingly, the throttle opening degree of the nozzle can be controlled in accordance with a load change such as a variation in the high-pressure refrigerant pressure or the high-pressure refrigerant temperature in the refrigerant cycle. The control valve controls the pressure of the refrigerant in the bypass passage in accordance with the load change of the refrigerant cycle, and the throttle opening degree of the nozzle is controlled by the pilot valve in accordance with the pressure. Therefore, in throttle control system, a large stroke mechanism of the control valve is not required. Therefore, the size of the throttle control system can be reduced.

Preferably, the throttle control system further includes a fixed valve that is disposed in the bypass passage to generate a middle pressure refrigerant by using a pressure difference between refrigerant upstream from the fixed value and refrigerant downstream from the fixed valve, and the pilot valve controls of the throttle opening degree of the nozzle in accordance with a pressure difference between the middle pressure refrigerant in the bypass passage and the refrigerant in the high-pressure refrigerant inlet port of the ejector. In this case, the fixed valve can be disposed in the bypass passage upstream from the control valve or downstream from the control valve. For example, the diverging point of the bypass passage is provided in a high-pressure refrigerant passage through which the high-pressure refrigerant inlet port of the ejector is connected to an outlet of the radiator. On the other hand, the join point of the bypass passage is provided in a low-pressure refrigerant passage. For example, the low-pressure refrigerant passage is a passage for connecting the low-pressure refrigerant inlet port of the ejector and an outlet of the evaporator, a passage for connecting a liquid refrigerant outlet of the gas-liquid separator and an inlet of the evaporator, or a passage for connecting the outlet of the pressure increasing portion and an inlet of the gas-liquid separator.

On the other hand, a pressure regulating member is disposed in the throttle control system upstream from the high-pressure refrigerant inlet port of the ejector to generate a middle pressure refrigerant in the bypass passage, having a pressure between the pressure of the refrigerant upstream from the pressure regulating member and the pressure of the refrigerant downstream from the pressure regulating member. In this case, the pilot valve controls the throttle opening degree of the nozzle in accordance with the pressure difference between the middle pressure refrigerant in the bypass passage and the refrigerant pressure in the high-pressure refrigerant inlet port. For example, the pressure regulating member is a valve that keeps the pressure difference at a predetermined fixed value.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE PRESENTLY PREFERRED EMBODIMENTS

Figure 1:
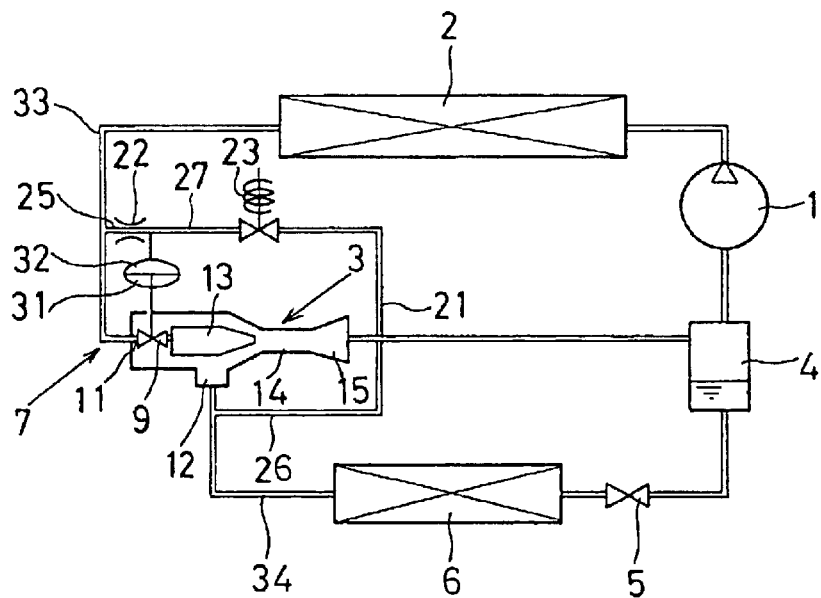
FIG. 1 is a schematic diagram showing a refrigerant cycle according a first embodiment of the present invention.
Figure 3:
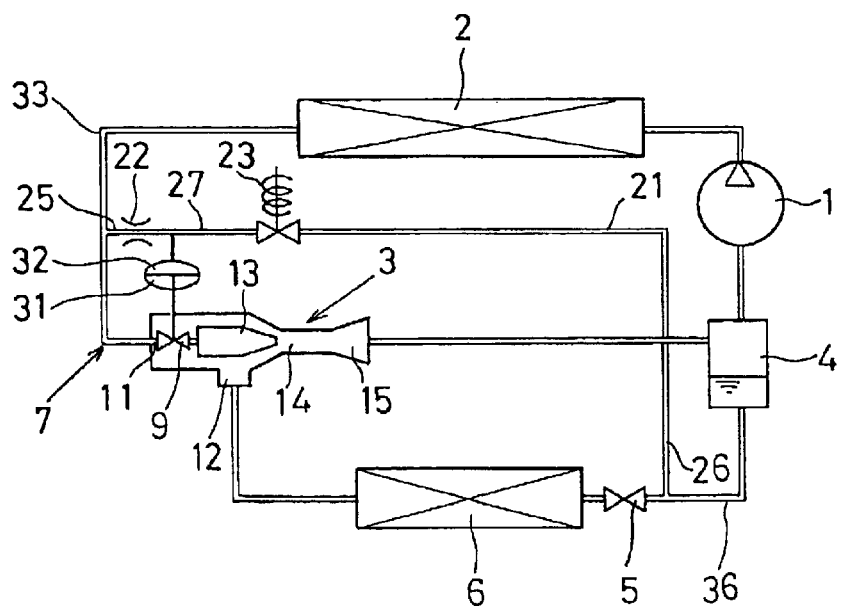
FIG. 3 is a schematic diagram showing a refrigerant cycle according a second embodiment of the present invention.

The preferred embodiments of the present invention will be explained with reference to the accompanying drawings. The same or similar component parts are designed with the same or similar numbers throughout the embodiments.
(First Embodiment)

A refrigerant cycle according to the first embodiment is an ejector cycle for an air conditioner of an automobile. The refrigerant cycle including a compressor 1, a gas cooler 2 (radiator), an ejector 3 and a gas-liquid separator 4, which are circularly connected. Moreover, in the refrigerant cycle, a liquid-refrigerant outlet port of the gas-liquid separator 4 and a low-pressure refrigerant inlet port 12 of the ejector 3 are connected by a low-pressure side refrigerant passage 34. Further, in the low-pressure side refrigerant passage 34, a decompressor 5 and an evaporator 6 are provided.

The refrigerant cycle is a supercritical vapor compression ejector cycle, for example, employing refrigerant that includes carbon dioxide as a main constituent. The critical temperature of the carbon dioxide is low. In the supercritical vapor compression ejector cycle, the refrigerant is compressed in the compressor 1 to be higher than its critical pressure. Therefore, the temperature of the refrigerant flowing into the gas cooler 2, i.e., the refrigerant discharged from the compressor 1 is heightened to 120° C. Accordingly, even when the heat of the refrigerant is radiated in the gas cooler 2, the refrigerant is not liquefied.

The compressor 1 is rotationally driven by an engine (not shown) or an electric motor (not shown) in an engine compartment. The compressor 1 compresses refrigerant gas sucked from the gas-liquid separator 4, and thereafter discharges this compressed refrigerant toward the gas cooler 2. Specifically, the compressor 1 temporarily compresses the gas refrigerant to be higher than its critical pressure under a predetermined use condition.

The gas cooler 2, for radiating the heat of the gas refrigerant from the compressor 1, is disposed in a well ventilated part of the engine compartment. In the gas cooler 2, the heat of the refrigerant gas is absorbed by air that is blown from the outside of the passenger compartment by a cooling fan (not shown).

The ejector 3 includes a high-pressure refrigerant inlet port 11, the low-pressure refrigerant inlet port 12, a nozzle 13, a mixing portion 14 and a diffuser 15. The ejector 3 sucks high pressure refrigerant from the high-pressure refrigerant inlet port 11 and jets it from the exit opening of the nozzle 13 at high speed. In this process, the pressure around this jetted refrigerant drops inside the ejector 3, and thereby (i.e. by entainment of the jetted refrigerant) the low pressure refrigerant is sucked from the low pressure refrigerant inlet port 12. Afterward, the refrigerant jetted from the nozzle 13 and the low pressure refrigerant sucked from the low-pressure refrigerant inlet port 12 are mixed in the mixing portion 14 and are diffused in the diffuser 15. In the first embodiment, the high-speed refrigerant jetted from the nozzle 13 and the low-pressure refrigerant sucked from the low pressure refrigerant inlet port 12 are mixed so that the pressure of the mixed refrigerant is increased in both of the mixing portion 14 and the diffuser 15. Therefore, in the ejector 3, a pressure-increasing portion is constructed with the mixing portion 14 and the diffuser 15. Thereafter, the refrigerant is discharged from the outlet of the diffuser 15 of the ejector 3 into the gas-liquid separator 4. The ejector 3 is integrally provided with a throttle control system 7, which can change a throttle opening degree (exit-opening radial dimension) of the nozzle 13 in accordance with the load.

The gas-liquid separator 4 is an accumulator, which separates the refrigerant, discharged from the ejector 3, into the gas refrigerant and the liquid refrigerant.

The decompressor 5 is a fixed throttle, such as a capillary tube and an orifice, which can decompress the liquid refrigerant flowing from the gas-liquid separator 4 to a gas-liquid two-phase refrigerant.

The evaporator 6 is an endothermic device, in which the refrigerant absorbs heat from air blown from a blower fan (not shown), and thereby the refrigerant is evaporated. The refrigerant evaporated in the evaporator 6 is sucked to the ejector 3 through the low-pressure refrigerant inlet port 12.

The throttle control system 7 includes a bypass passage 21, an orifice 22, a control valve 23, and a pilot valve 9. The bypass passage 21 is diverged from a high-pressure side refrigerant passage 33 between the gas cooler 2 and the ejector 3 at a diverged point, and is joined to the low-pressure side refrigerant passage 34 between the evaporator 6 and the low-pressure refrigerant inlet port 12 of the ejector 3 at a join point that is downstream from the diverged point. The orifice 22 is provided in the bypass passage 21 on the side of that diverged point. The control valve 23 is an electromagnetic actuator, and is disposed in the bypass passage 21 on the side of the join point as compared with the position of the orifice 22. The pilot valve 9 changes the throttle opening degree of the nozzle 13 in accordance with difference between the pressure of the refrigerant in the bypass passage 21 and the pressure of the refrigerant in the high pressure refrigerant inlet port 11. Moreover, the orifice 22 is a fixed throttle for generating a middle pressure refrigerant between the orifice 22 and the control valve 23.

The pressure of the middle pressure refrigerant is between the pressure of the high pressure refrigerant before being decompressed in the nozzle 13 and the pressure of the low pressure refrigerant after being decompressed in the decompressor 5.

Figure 2:
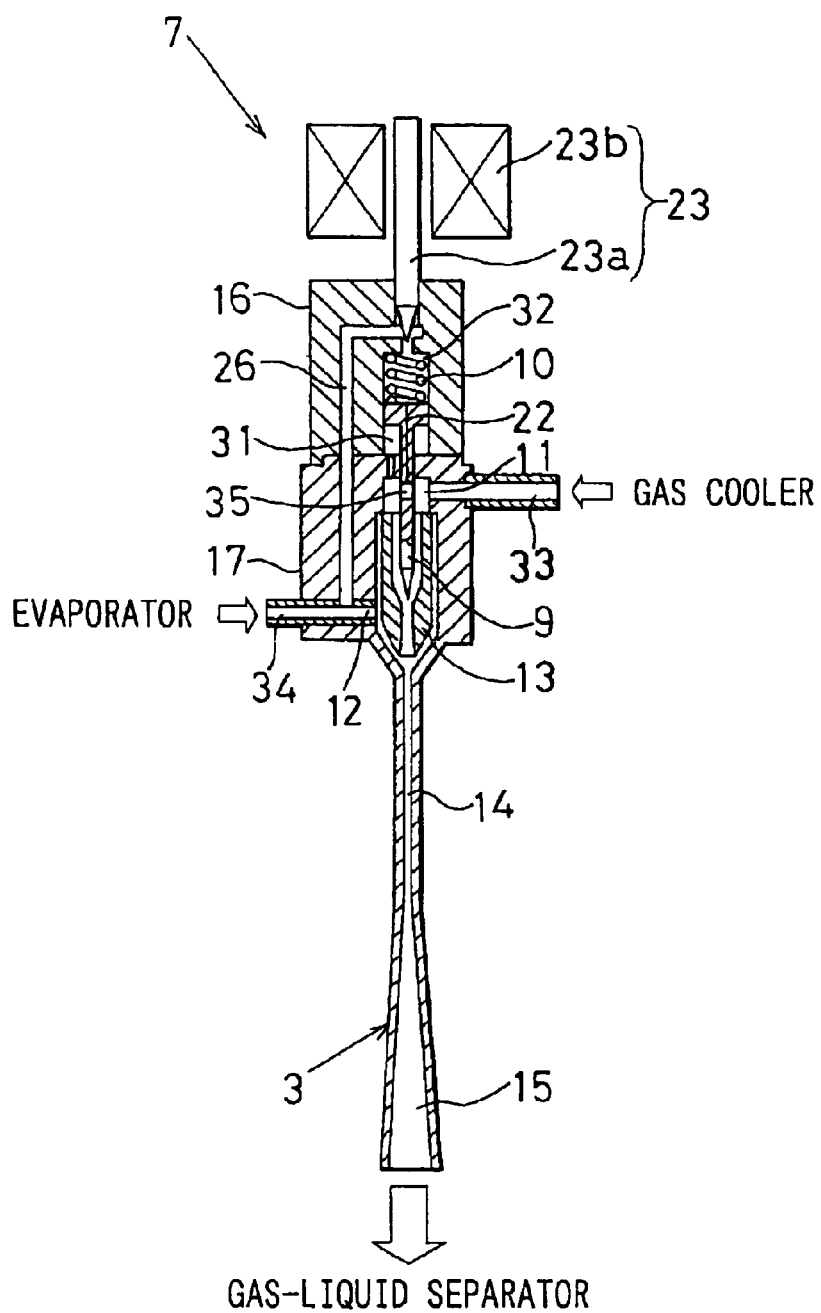
FIG. 2 is a cross-sectional view of an ejector of the refrigerant cycle according to the first embodiment of the present invention.

The bypass passage 21 includes a high-pressure refrigerant passage 25 connected to the diverged point and extending from the diverged point to the orifice 22, a middle pressure passage 27 between the orifice 22 and the control valve 23, and a low-pressure refrigerant passage 26 between the control valve 23 and the join point, all of which are formed inside housings 16, 17 of the ejector 3 as shown in FIG. 2. Moreover, the orifice 22 is formed in a part of the high-pressure refrigerant passage 25 or in all the high-pressure refrigerant passage 25.

In the first embodiment, the bypass passage 21 is formed to be diverged from the diverged point of the high-pressure side refrigerant passage 33. Moreover, the bypass passage 21 is joined to the join point of the low-pressure side refrigerant passage 34. Accordingly, the pressure of the refrigerant in the high-pressure side refrigerant passage 33 corresponds to the pressure of the refrigerant in the high-pressure refrigerant passage 25, and the pressure of the refrigerant in the low-pressure side refrigerant passage 34 corresponds to the pressure of the refrigerant in the low-pressure refrigerant passage 26.

The control valve 23 serves as an actuator for driving the pilot valve 9 in its axial direction. As shown in FIG. 2, the control valve 23 includes a needle valve 23a, an electromagnetic coil 23b, and a needle biasing means (not shown). The needle valve 23a controls the opening area (valve opening degree) of the low-pressure refrigerant passage 26. The electromagnetic coil 23b drives the needle valve 23a in a valve closing direction. The needle biasing means is, for example, a spring, which biases the needle valve 23a in a valve-opening direction. In the control valve 23, the valve opening degree of the needle valve 23a is controlled, for example, in accordance with an electric signal, which is applied from an electric control unit (not shown) into the electromagnetic coil 23b.

The pilot valve 9 controls the throttle opening degree of the nozzle 13, so the nozzle 13 can serve as a throttle changeable nozzle. Specifically, the pilot valve 9 controls the throttle opening degree in accordance with difference between the pressure of the refrigerant in a first pressurized compartment 31 and the pressure of the middle pressure refrigerant in a second pressurized compartment 32. The pressure of the refrigerant in the first pressurized compartment 31 is the same as the pressure of the refrigerant in the high-pressure refrigerant inlet part 11. The pressure of the refrigerant in the second pressurized compartment 32 is the same as the pressure of the refrigerant in the middle pressure refrigerant passage 27.

Moreover, as shown in FIG. 2, the pilot valve 9 has a rod portion having a small radial diameter, a flange portion having a large radial diameter. The orifice 22 is provided in the pilot valve 9, and a passage opening 35 on the side of the high-pressure refrigerant inlet port 11 and the second pressurized compartment 32 communicate with each other through the orifice 22. Moreover, the pressurized compartments 31, 32 are formed in a part of a substantially U-shape passage inside the housing 16, and are divided by the flange portion of the pilot valve 9 into the first pressurized compartment 31 under the flange portion of the pilot valve 9 and the second pressurized compartment 32 above the flange portion of the pilot valve 9.

The pilot valve 9 is slidably movable in its axial direction inside the housings 16, 17 by the difference between the pressures of compartments 31, 32 and biasing force of a return spring 10, which biases the pilot valve 9 so as to reduce the throttle opening degree of the nozzle 13. In accordance with the position of the pilot valve 9 in its axial direction, the throttle opening degree of the nozzle 13 is controlled.

Each refrigerant component in the refrigerant cycle, particularly, the electromagnetic coil 23b of the control valve 23 is electronically controlled by the electronic control unit (ECU). The ECU includes a CPU, a ROM and an I/O ports and a microcomputer. Moreover, a refrigerant thermal sensor (not shown) is provided for detecting the temperature of the refrigerant flowing from the outlet port of the gas cooler 2 (i.e., high-pressure side refrigerant), and a refrigerant pressure sensor (not shown) is provided for detecting the pressure of the refrigerant flowing from the outlet port of the gas cooler 2. Sensor signals from the refrigerant thermal sensor and the refrigerant pressure sensor are changed from analog to digital forms by an input circuit, i.e., an A/D converter circuit (not shown) and thereafter inputted into the microcomputer.

The ECU calculates a load variation or a load state of the refrigerant cycle on the basis of the detected refrigerant temperature and the detected refrigerant pressure, and thereafter sends drive signals to the electromagnetic coil 23b in accordance with the load variation or the load condition. The ECU determines that the load is high in a case where the refrigerant temperature is detected as high, or in a case where the refrigerant pressure is detected as high. When the ECU determines that the load is high, the drive signals are applied to the electromagnetic coil 23b so that the throttle opening degree of the nozzle 13 becomes larger, that is, the needle valve 23a is driven upward so as to reduce the pressure of the middle pressure refrigerant in the middle refrigerant passage 27 of the bypass passage 21.

Hereinafter, the operation of the refrigerant cycle will be described with reference to FIGS. 1 and 2. The refrigerant gas, which is compressed by the compressor 1 and thereby has high pressure and high temperature, flows into the gas cooler 2 (radiator) through its inlet port. While the refrigerant gas passes through the gas cooler 2, the heat of the refrigerant gas is radiated to outside air so that the refrigerant is cooled. Moreover, the refrigerant discharged from the outlet port of the gas cooler 2 flows into the nozzle 13 through the high-pressure side refrigerant passage 33, the high-pressure refrigerant inlet port 11, and the passage opening 35. The refrigerant sucked into the nozzle 13 is decompressed while passing through the nozzle 13 and thereafter jetted from the exit of the nozzle 13 into the mixing portion 14.

At this time, through the use of pressure reducing force around the flow of the refrigerant jetted at high speed from the nozzle 13 (i.e., entaiment force), the low-pressure refrigerant is sucked from the evaporator 6 into the low-pressure refrigerant inlet port 12 of the ejector 3. After the refrigerant jetted from the nozzle 13 and the refrigerant sucked from the evaporator 6 are efficiently mixed in the mixing portion 14, this mixed refrigerant is diffused in the diffuser 15 to be further mixed. Moreover, this gas-liquid refrigerant discharged from the diffuser 15 flows into the gas-liquid separator 4 and is separated into the gas refrigerant and the liquid refrigerant.

The separated gas refrigerant is drawn into the compressor 1, and the separated liquid refrigerant is drawn into the decompressor 5 by means of sucking force of the ejector 3 from its low-pressure refrigerant inlet port 12. Moreover, the liquid refrigerant from the gas-liquid separator 4 is decompressed and expanded to a gas-liquid two-phase state while passing through the decompressor 5, and thereafter flows into the evaporator 6. The gas-liquid refrigerant absorbs from air, flowing in the air conditioner duct, while passing through the evaporator 6, so that the gas-liquid refrigerant is evaporated in the evaporator 6 and is changed to the low-pressure refrigerant gas. Afterward, the low-pressure refrigerant gas is sucked by the ejector 3 through the low-pressure refrigerant inlet port 12, and is mixed with the refrigerant jetted from the nozzle 13 inside the mixing portion 14.

A part of the refrigerant flowing from the high-pressure side refrigerant passage 33 is introduced into the bypass passage 21 and is decompressed through the orifice 22. The refrigerant introduced into the high-pressure refrigerant passage 25 can be decompressed into the same pressure as the refrigerant in the low-pressure refrigerant inlet port 12 in accordance with the setting position of the needle valve 23a, and furthermore is introduced into the low-pressure refrigerant inlet port 12 through the join port. In this connection, the refrigerant flowing in the middle pressure refrigerant passage 27 of the bypass passage 21 has a middle pressure corresponding to the pressure of the refrigerant in the second pressurized compartment 32. The pressure of the middle pressure refrigerant is between that of the refrigerant in the high-pressure refrigerant inlet port 11 and that of the refrigerant in the low pressure refrigerant inlet port 12.

Moreover, as the throttle opening degree of the needle valve 23a becomes smaller, i.e., as the needle valve 23a is driven lower, the pressure of the middle pressure refrigerant introduced to the second pressurized compartment 32 is more heightened. On the other hand, as the throttle opening degree of the needle valve 23a becomes larger, i.e., as the needle valve 23a is driven upper, the pressure of the middle pressure refrigerant introduced to the second pressurized compartment is more lowered. Accordingly, the high pressure refrigerant in the first pressurized compartment 31 is applied to the pilot valve 9, and the middle pressure refrigerant in the second pressurized compartment 32 is also applied to the pilot valve 9. Therefore, a pressure difference is caused between upper and lower sides of the flange portion of the pilot valve 9 in its axial direction. By the pressure deference and the biasing force of the return spring 10, the position of the pilot valve 9 is controlled, i.e., the throttle opening degree of the nozzle 13 is controlled. Moreover, when the valve opening degree of the needle valve 23a is changed in accordance with the load variation or the load state, the pressure of the middle pressure refrigerant in the second pressurized compartment 32 is changed, and the position of the pilot valve 9 can be controlled.

Therefore, when the refrigerant cycle needs high load in a cooling-down operation in summer, the needle valve 23a is moved upward so that its opening degree becomes large. Accordingly, the pressure of the middle pressure refrigerant in the second pressure compartment 32 is lowered, and thereby the pilot valve 9 is moved upward so that the throttle opening degree of the nozzle 13 becomes large. In this case, the circulating amount of the refrigerant in the refrigerant cycle can be increased. On the other hand, when the refrigerant cycle needs low load in a dehumidifying operation in winter, the needle valve 23a is moved downward so its opening degree becomes small. Accordingly, the pressure of the middle pressure refrigerant in the second pressure compartment 32 is heightened, and thereby the pilot valve 9 is moved downward so that the throttle opening degree of the nozzle 13 becomes small. In this case, the circulating amount of the refrigerant in the refrigerant cycle can be decreased.

In the refrigerant cycle according to the first embodiment, the pressure of the middle pressure refrigerant is controlled in accordance with the opening degree of the needle valve 23a, so that the moving position of the pilot valve 9 can be arbitrarily controlled. Moreover, since the pilot valve 9 is not directly moved, i.e., the pilot valve 9 is moved through the use of the needle valve 23a, the stroke range of the pilot valve 9 can be made larger than that of the needle valve 23a.

Therefore, even when the stroke range of the needle valve 23a is not so large, the ejector 3 can be used in any use environments with a large load change. Moreover, even though the stroke range of the pilot valve 9 is required to be large, the control valve 23 for driving the pilot valve 9 can be made to be compact. That is, the throttle control system 7 can be more compact.

Moreover, when the rotation speed of the compressor 1 is suddenly heightened, for example, in accelerating, and thereby the amount of the refrigerant sucked into the nozzle 13 from the high pressure refrigerant inlet port 11 suddenly increases, or when the pressure of the high pressure refrigerant discharged from the gas cooler 2 increases, the pilot valve 9 can be shifted upward faster than the opening degree change of the needle valve 23a. Therefore, the throttle opening degree of the nozzle 13 can be rapidly accurately controlled in response to sudden pressure increment.

Further, because the pilot valve 9 is used, the actuator for driving the pilot valve 9 can be made to be accurately responsive to the change of the pressure. That is, the responsivity of the throttle control system 7 can be enhanced against the sudden pressure change. Accordingly, excessive pressure increment can be prevented in the refrigerant cycle, and it can prevent the refrigerant components of the refrigerant cycle from being broken.

Furthermore, in the throttle control system 7, the high-pressure refrigerant passage 25, the orifice 22 and the low-pressure refrigerant passage 26 are formed inside the housing 17, where the high-pressure refrigerant inlet port 11 and the low-pressure refrigerant inlet port 12 are formed. That is, the high-pressure refrigerant passage 25, the orifice 22 and the low-pressure refrigerant passage 26 can be arranged relatively closely to each other. Therefore, the throttle control system 7 can be easily simplified and integrated.

(Second Embodiment)

In the first embodiment, the high-pressure refrigerant passage 25 of the bypass passage 21 is communicated with the high-pressure side refrigerant passage 33 at a position upstream from the high-pressure inlet port 11 of the ejector 3. Moreover, the low-pressure refrigerant passage 26 is communicated with the low-pressure side refrigerant passage 34 at a position downstream from the evaporator 6.

In the second embodiment, the low-pressure refrigerant passage 26 is communicated with a low-pressure side refrigerant passage 36 through which the gas-liquid separator 4 communicates with the refrigerant inlet of the evaporator 6.

Accordingly, in the refrigerant cycle according to the second embodiment, the refrigerant flows from the middle pressure passage 27 into the low-pressure side refrigerant passage 36 through the low-pressure refrigerant passage 26, and is heat-exchanged in the evaporator 6 with air flowing in the air conditioner duct. Therefore, the cooling performance of the refrigerant cycle can be enhanced more than that of the first embodiment.

(Third Embodiment)

Figure 4:
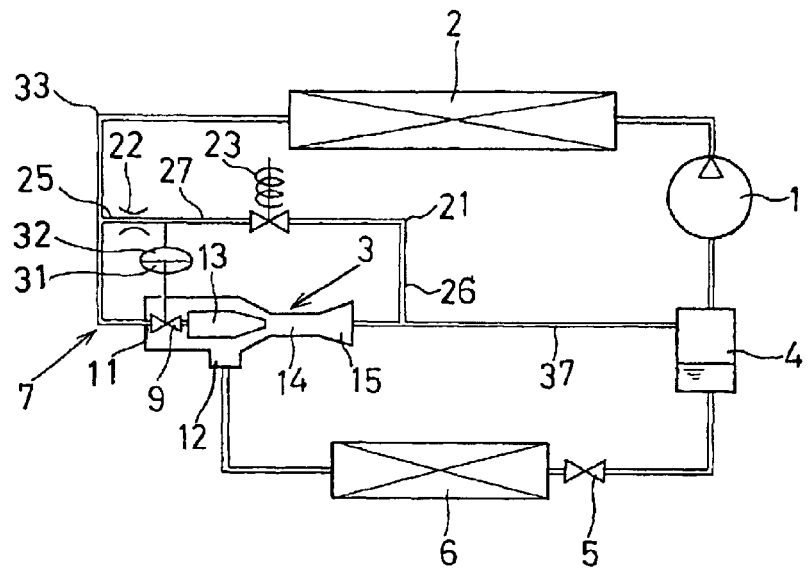
FIG. 4 is a schematic diagram showing a refrigerant cycle according a third embodiment of the present invention.

As shown in FIG. 4, in the refrigerant cycle according to the third embodiment, the low-pressure refrigerant passage 26 is communicated with a low-pressure side refrigerant passage 37 through which the ejector 3 and the gas-liquid separator 4 are communicated each other.

In general, while the refrigerant cycle is operated, the pressure of the refrigerant discharged from the ejector 3 is higher than the pressure of the refrigerant in the low-pressure side refrigerant passages 34, 36 described in the first or the second embodiment. Accordingly, in the refrigerant cycle according to the third embodiment, the pressure of the refrigerant introduced into the low-pressure refrigerant passage 26 is higher. Therefore, the cooling performance of the refrigerant cycle can be further improved.

(Fourth Embodiment)

Figure 5:
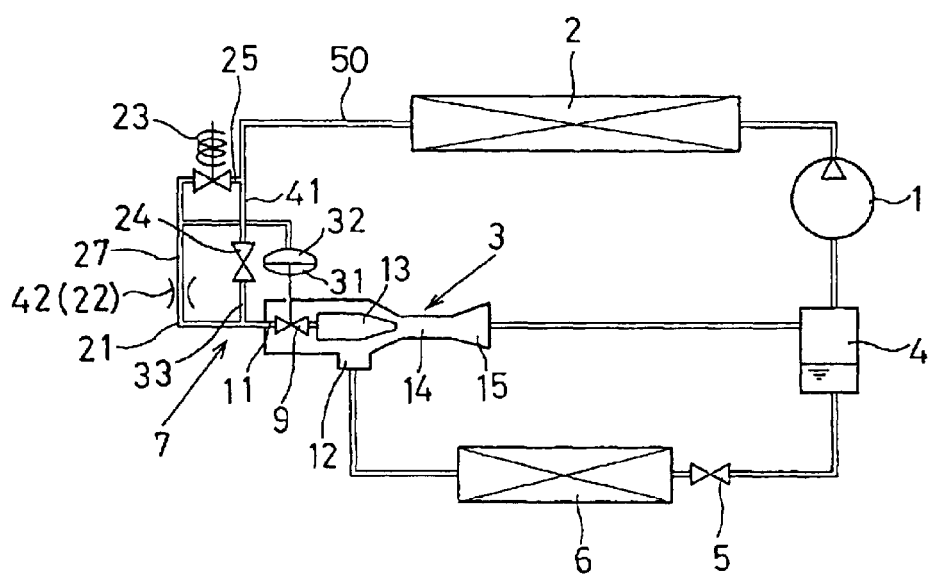
FIG. 5 is a schematic diagram showing a refrigerant cycle according a fourth embodiment of the present invention.
Figure 6:
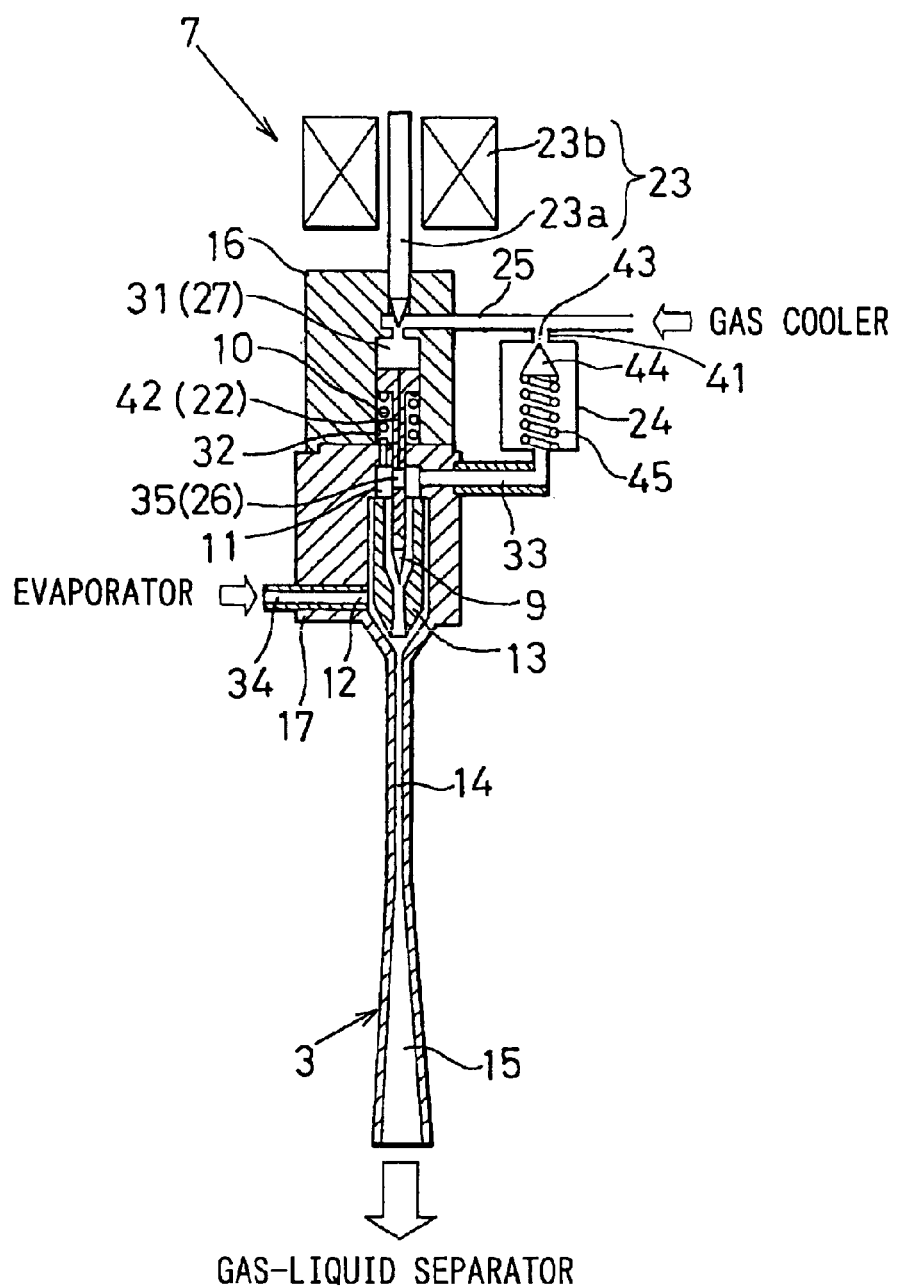
FIG. 6 is a cross-sectional view of an ejector of the refrigerant cycle according to the fourth embodiment of the present invention.
Figure 7:
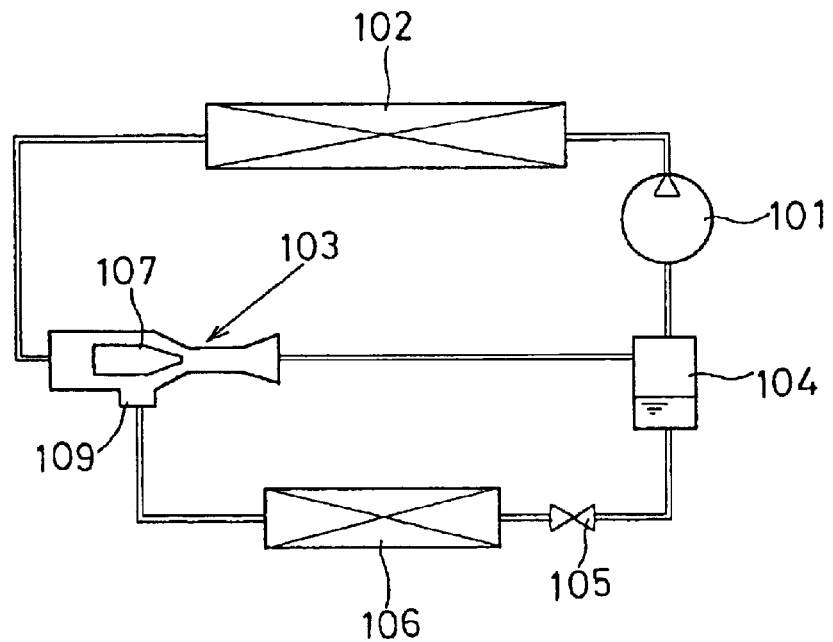
FIG. 7 is a schematic diagram showing a refrigerant cycle according a prior art.
Figure 8:
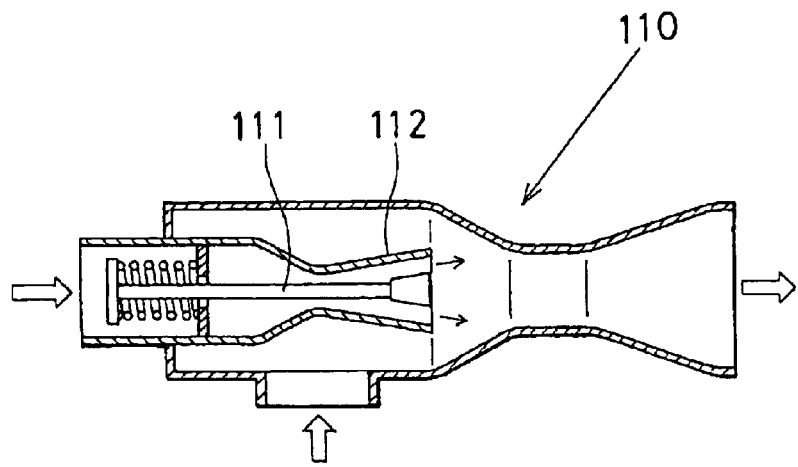
FIG. 8 is a cross-sectional view showing a conventional ejector of a refrigerant cycle.

Referring to FIGS. 5 and 6, in the fourth embodiment, the throttle control system 7 includes a bypass passage 21, an orifice 22, a control valve 23 and a pilot valve 9. The bypass passage 21 diverges from a high-pressure side refrigerant passage 50 through which the refrigerant from the gas cooler 2 flows, at a diverged point upstream from the high-pressure refrigerant inlet port 11 of the ejector 3. The orifice 22 is disposed in the bypass passage 21 adjacent to a join point, and the control valve 23 is disposed in the bypass passage 21 adjacent to the diverged point. The pilot valve 9 changes the throttle opening degree of the nozzle 13 in accordance with a difference between the pressure of the refrigerant in the bypass passage 21 (i.e., the pressure of the refrigerant in the second pressurized compartment 32) and the pressure of the refrigerant in the high-pressure refrigerant inlet port 11 (i.e., the pressure of the refrigerant in the first pressurized compartment 31). The pressure of the refrigerant in the second pressurized compartment 32 is the pressure of the middle-pressure refrigerant between the orifice 22 and the control valve 23.

The bypass passage 21 includes a high-pressure refrigerant passage 25, a low-pressure refrigerant passage 26 and a middle pressure passage 27 between the passages 25, 26. All of the passages 25–27 are formed inside the housings 16, 17 of the ejector 3 (see FIG. 6). The high-pressure refrigerant passage 25 diverges from the high-pressure side refrigerant passage 50 at the diverged point. The low-pressure refrigerant passage 26 is joined to the join point. The middle pressure passage 27 is between the control valve 23 and the orifice 22. Moreover, the second pressurized compartment 32 is provided to communicate with the middle pressure passage 27.

In the fourth embodiment, the high-pressure side refrigerant passage 50 is separated into a first high-pressure side refrigerant passage 41 and a second high-pressure side refrigerant passage 42 (bypass passage 21). A pressure regulating valve 24 is provided in the refrigerant passage 41. The pressure regulating valve 24 is a fixed pressure regulating valve for generating a middle pressure on the basis of the pressure difference between its upstream refrigerant and its downstream refrigerant. The pressure regulating valve 24 includes a valve hole 43, a valve body 44 and a return spring 45. The valve body 44 is for regulating the opening degree of the valve hole 43 communicating with the refrigerant passage 33. The return spring 45 biases the valve body 44 in an opening direction of the valve hole 43.

In the fourth embodiment, all the refrigerant from the middle pressure 27 passes through the nozzle 13 of the ejector 3, so the ejector efficiency can be improved. Moreover, the refrigerant decompressed by the refrigerant components other than the nozzle 13 does not relate to the work of the ejector 3. Therefore, in general, the more the refrigerant flows into the nozzle 13, the higher the suction force of refrigerant from the outlet port of the evaporator 6 becomes.

(Other Embodiment)

The present invention is not limited to be applied to the supercritical cycle of the carbon dioxide. For example, the present invention can be applied for an ejector cycle employing Freon as the refrigerant. Moreover, the refrigerant cycle of the present invention can be used for systems other than the air conditioning system of the vehicle, for example, the electric water heater. In this case, the gas cooler 2 (i.e., radiator, condenser) is used for heating water to be supplied, and the refrigerant is evaporated in the evaporator 6 by absorbing heat from the outside air.

In the first-third embodiments, the control valve 23 is disposed downstream from the orifice 22 in the bypass passage 21, so that the middle pressure refrigerant is formed between the orifice 22 and the control valve 23. However, the control valve 23 may be disposed upstream from the orifice 22 in the bypass passage 21, so that the middle pressure refrigerant is formed between the control valve 23 and the orifice 22.

In the fourth embodiment, the outlet port of the gas cooler 2 and the high-pressure refrigerant inlet port 11 of the ejector 3 are directly connected by the refrigerant passage. However, in the refrigerant passage between the outlet port of the gas cooler 2 and the high-pressure refrigerant inlet port 11 of the ejector 3, an inner heat exchanger may be disposed. Such the inner heat exchanger is desired to be a refrigerant-refrigerant heat exchanger, which can perform heat exchange between the gas refrigerant discharged from the gas cooler 2 and the gas refrigerant discharged from the gas-liquid separator 4. In this case, the refrigerant flowing toward the inlet port of the compressor 1 can be heated by using high-temperature refrigerant flowing from the gas cooler 2.

Moreover, in the above-described embodiments, the electromagnetic control valve 23, serving as the actuator for driving the pilot valve 9, includes the needle valve 23a, the electromagnetic coil 23b and the needle biasing means, such as the spring. However, a motorized control valve, for example, driven by a stepping motor, a pressure control valve, or a mechanical control valve may be employed as the actuator.

Furthermore, the present invention should not be limited to the embodiments previously discussed and shown in the figures, but may be implemented in various ways without departing from the spirit of the invention.

What is claimed is:

1. A refrigerant cycle comprising:
    a gas-liquid separator for separating refrigerant into gas refrigerant and liquid refrigerant;
    an evaporator in which the liquid refrigerant flowing from the gas-liquid separator is evaporated after being decompressed;
    a compressor for compressing the gas refrigerant from the gas-liquid separator;
    a radiator which cools the refrigerant discharged from the compressor;
    an ejector including
        a high-pressure refrigerant inlet port from which refrigerant from the radiator is introduced,
        a low-pressure refrigerant inlet port from which refrigerant from the evaporator is sucked,
        a nozzle for decompressing refrigerant introduced from the high-pressure refrigerant inlet port, and
        a pressure-increasing portion in which refrigerant from the evaporator is sucked through the low-pressure refrigerant inlet port by a flow of refrigerant jetted from the nozzle and is mixed with the refrigerant jetted from the nozzle, the pressure-increasing portion having a refrigerant outlet from which refrigerant is discharged to the gas-liquid separator; and a throttle control system including
- a bypass passage diverged from a refrigerant passage at a diverging point that is upstream from the high-pressure refrigerant inlet port, and being joined to the refrigerant passage at a join point that is downstream from the diverging point,
- a control valve for controlling a pressure of the refrigerant flowing through the bypass passage, and
- a pilot valve that controls of a throttle opening degree of the nozzle in accordance with a pressure difference between the refrigerant in the bypass passage and the refrigerant in the high-pressure refrigerant inlet port of the ejector.

2. The refrigerant cycle according to claim 1, wherein:
the throttle control system further includes a fixed valve that is disposed in the bypass passage to generate a middle pressure refrigerant by using a pressure difference between refrigerant upstream from the fixed value and refrigerant downstream from the fixed valve; and
the pilot valve controls of the throttle opening degree of the nozzle in accordance with a pressure difference between the middle pressure refrigerant in the bypass passage and the refrigerant in the high-pressure refrigerant inlet port of the ejector.

3. The refrigerant cycle according to claim 1, wherein the fixed valve is disposed in the bypass passage upstream from the control valve.

4. The refrigerant cycle according to claim 1, wherein the fixed valve is disposed in the bypass passage downstream from the control valve.

5. The refrigerant cycle according to claim 1, wherein:
the high-pressure refrigerant inlet port of the ejector is coupled to an outlet of the radiator by a high-pressure refrigerant passage;
the low-pressure refrigerant inlet port is coupled to an outlet of the evaporator by a low-pressure refrigerant passage;
the diverging point of the bypass passage is provided in the high-pressure refrigerant passage; and
the join point of the bypass passage is provided in the low-pressure refrigerant passage.

6. The refrigerant cycle according to claims 1, wherein:
the high-pressure refrigerant inlet port of the ejector is coupled to an outlet of the radiator by a high-pressure refrigerant passage;
the gas-liquid separator has a liquid refrigerant outlet that is coupled to an inlet of the evaporator by a low-pressure refrigerant passage;
the diverging point of the bypass passage is provided in the high-pressure refrigerant passage; and
the join point of the bypass passage is provided in the low-pressure refrigerant passage.

7. The refrigerant cycle according to claim 1, wherein:
the high-pressure refrigerant inlet port of the ejector is coupled to an outlet of the radiator by a high-pressure refrigerant passage;
the outlet of the pressure increasing portion of the ejector is coupled to an inlet of the gas-liquid separator by a low-pressure refrigerant passage;
the diverging point of the bypass passage is provided in the high-pressure refrigerant passage; and
the join point of the bypass passage is provided in the low-pressure refrigerant passage.

8. The refrigerant cycle according to claim 1, further comprising:
a pressure regulating member, which is disposed upstream from the high-pressure refrigerant inlet port of the ejector to generate a middle pressure refrigerant in the bypass passage, having a pressure between the pressure of the refrigerant upstream from the pressure regulating member and the pressure of the refrigerant downstream from the pressure regulating member,
wherein the pilot valve controls the throttle opening degree of the nozzle in accordance with the pressure difference between the middle pressure refrigerant in the bypass passage and the refrigerant pressure in the high-pressure refrigerant inlet port.

9. The refrigerant cycle according to claim 8, wherein the pressure regulating member is a valve, which keeps the pressure difference between the refrigerant upstream from the pressure regulating member and the refrigerant downstream from the pressure regulating member, at a predetermined fixed value.

10. The refrigerant cycle according to claim 1, further comprising a decompressing means for decompressing refrigerant to be introduced to the evaporator from the gas-liquid separator.

11. The refrigerant cycle according to claim 1, wherein the control valve changes the refrigerant pressure in the bypass passage based on a load variation.

* * * * *